May 19, 1936. W. H. FISCHER 2,041,327
ELECTRIC APPLIANCE SUPPORTING MEANS
Filed Sept. 18, 1935

Inventor
William H. Fischer
By Bair, Freeman & Sinclair
Attorneys

Witness
H. S. Wingenmaier

Patented May 19, 1936

2,041,327

UNITED STATES PATENT OFFICE 2,041,327

ELECTRIC APPLIANCE SUPPORTING MEANS

William H. Fischer, St. Louis, Mo., assignor to Knapp-Monarch Company, St. Louis, Mo., a corporation of Missouri Application September 18, 1935, Serial No. 41,091

18 Claims. (Cl. 53—5)

The object of my invention is to provide an electric appliance supporting means which is simple, durable and comparatively inexpensive to manufacture.

A further object is to provide supporting means for the casing of an electric appliance or the like which forms combined handles and feet for the casing.

Still another object is to provide an efficient yet inexpensive supporting means for an appliance casing which spaces the casing above a supporting surface and has handles for lifting and carrying the casing when desired.

Still a further object is to provide supporting means for a two-part hinged casing, the supporting means for one part comprising carrying handles and feet for the entire casing and the supporting means for the other part being operable as a supporting means when the parts are hinged to an open position, said last supporting means serving as a handle for opening the casing when desired.

Still a further object is to provide supporting means having a casing comprising a stamping which is readily connected to the casing and has a handle portion formed thereon so that connection of the supporting means to the casing also provides a handle without the necessity of separate connecting means for the handle.

With these and other objects in view my invention consists in the construction, arrangement and combination of the various parts of my device, whereby the objects contemplated are attained, as hereinafter more fully set forth, pointed out in my claims and illustrated in the accompanying drawing, in which:

Figure 1:
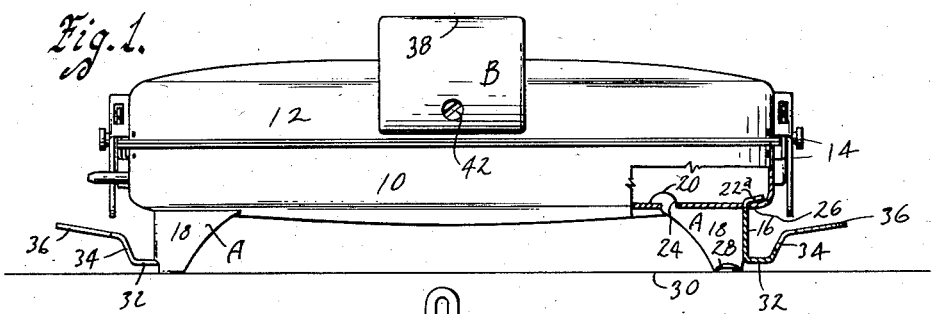
Figure 1 is a front elevation of an electric appliance showing my supporting means connected thereto and the appliance in closed position.

On the accompanying drawing, I have used the reference numeral 10 to indicate the lower part and 12 the upper part of a two part hinged electric appliance such as a sandwich toaster. The invention, however, can be applied to other appliances and casings and is not confined to electric appliances.

Figure 2:
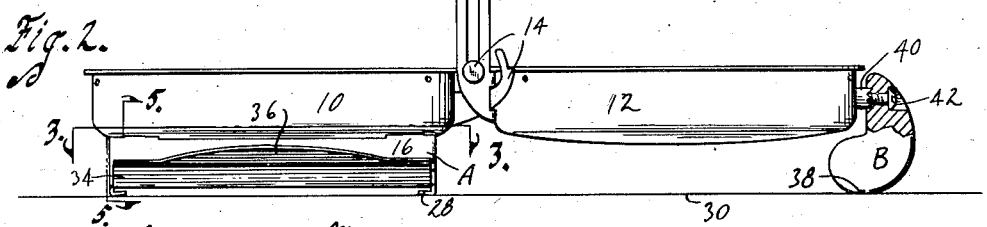
Figure 2 is an end elevation showing the appliance open.
Figure 3:
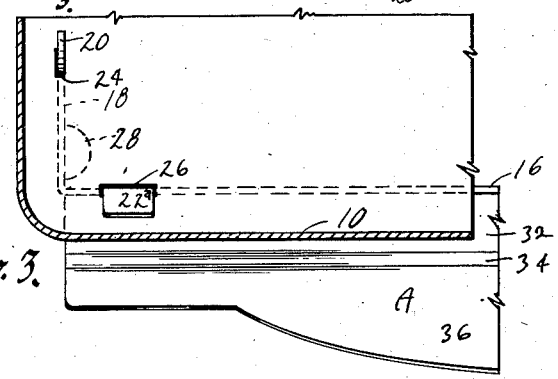
Figure 3 is an enlarged sectional view on the line 3—3 of Figure 2.

The casings 10 and 12 are hinged together by hinge mechanism 14 so that the upper part 12 can be swung to open position as shown in Figure 2 when it is desired to use the two parts of the casing as a grill or the like.

One of the primary objects of my present invention is to provide a very inexpensive handle and foot construction for the casing and for this purpose, I provide a pair of stampings A and a knob B of certain characteristics which will now be described.

The stamping A has a vertical flange 16 terminating in a pair of vertical flanges 18 extending at right angles to the flange 16. The upper edges of the flanges 16 and 18 are adapted for connection to the casing part 10, ears 20 and 22 being provided for this purpose.

Figure 5:
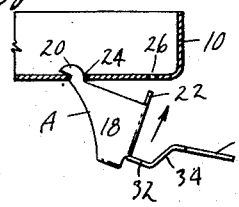
Figure 5 is a sectional view on the line 5—5 of Figure 2 showing the stamping being connected to the appliance casing.
Figure 4:
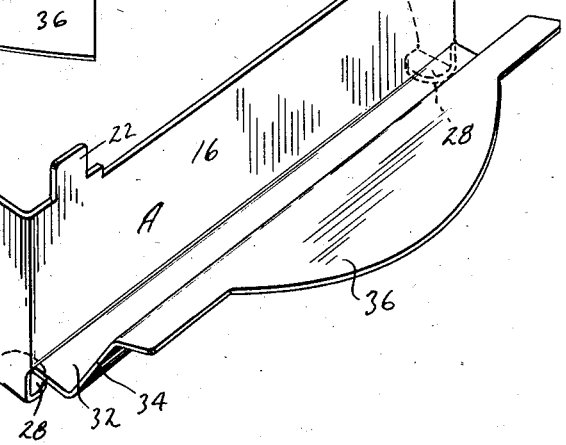
Figure 4 is a perspective view of a stamping embodying a portion of my invention.

The ears 20 are adapted to enter perforations 24 of the casing 10 as shown in Figure 5 by a swinging motion of the stamping A. The ears 22 finally swing through perforations 26 in the casing 10 as shown in Figure 5, whereupon they are bent over as indicated at 22a in Figure 1 to retain the stampings in position.

Two of the stampings A are used and each is provided with a pair of feet 28 whereby to support a casing 10 spaced from a table top or other surface indicated at 30.

The lower edge of the flange 16 bends outwardly as at 32, then upwardly at 34 and again outwardly at 36. The portion 36 serves as a handle whereby the stamping A serves both the purpose of supporting the appliance on the surface 30 and as a means to carrying the appliance by the handles 36.

Figure 6:
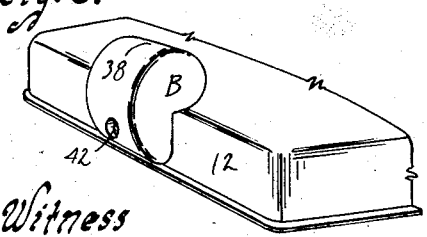
Figure 6 is a perspective view of a combined opening handle and supporting foot for the upper part of the appliance.

The stampings A are somewhat shorter than the width of the appliance as shown in Figure 2 and consequently when the appliance is open it would tip clockwise if it were not for the handle B which it will be noted has a foot portion 38 engaging the surface 30. The portion 38 when the appliance is closed as in Figure 6, projects above the part 12, while in the open position it projects therebelow as shown in Figure 2 to thus space the part 12 from the surface 30 as well as prevent tipping of the appliance.

The handle B may be connected to the part 12 in any suitable manner. I have shown a threaded stud 40 extending from the part 12 and the handle B is connected thereto by a screw 42.

By providing the handle B, it is unnecessary to enlarge the stamping A to provide a wide enough base to prevent the appliance from tipping and thus these stampings can be held to a small size consistent with good design and economy of manufacture. The stampings are readily assembled relative to the casing part 10 and thus make both the construction and assembly of the appliance very economical.

Though I have shown the ears 20 and 22, other means obviously can be used for securing the stampings to the casing; such a change and many others may be made in the construction and arrangement of the parts of my device without departing from the real spirit and purpose of my invention and it is my intention to cover by my claims, any modified forms of structure or use of mechanical equivalents, which may be reasonably included within their scope.

I claim as my invention:

1. In an electric appliance supporting means, a pair of stampings each having a foot portion and a handle portion and means for securing each of said stampings to an electric appliance casing.

2. Supporting means for an electric appliance casing or the like, comprising a stamping having vertical flanges, means for securing said vertical flanges to a casing or the like, feet on said flanges for engaging a supporting surface and a horizontal flange extending from said vertical flanges and serving as a handle for carrying said casing.

3. Supporting means for an electric appliance casing or the like, comprising a stamping having vertical flanges, means for securing said vertical flanges to a casing or the like, feet on said flanges for engaging a supporting surface and a horizontal flange extending from said vertical flanges and serving as a handle for carrying said casing, the means for securing said vertical flanges to said casing or the like comprising perforations in said casing and ears on said flanges engaged therewith.

4. Means for supporting a two part hinged electric appliance casing or the like comprising a pair of supporting feet on one of said parts for engaging a supporting surface and a handle on the other part for opening one part relative to the other and for engaging said surface when said appliance or the like is in its open position, each of said supporting feet comprising a member which is a combined foot and handle, the handles being provided to manually support each end of said casing for carrying it from one position to another.

5. Means for supporting a two part hinged electric appliance casing or the like comprising a pair of supporting feet on one of said parts for engaging a supporting surface and a handle on the other part for opening one part relative to the other and for engaging said surface when said appliance or the like is in its open position, each of said supporting feet comprising a member which is a combined foot and handle, the handles being provided to manually support each end of said casing for carrying it from one position to another, said parts of said casing, both when opened and closed, assuming a supine position.

6. Means for supporting a two part hinged casing or the like comprising a pair of supporting feet on one of said parts for engaging a supporting surface and a handle on the other part for opening one part relative to the other and for engaging said surface when said appliance or the like is in its open position, said handle having a portion projecting above the casing when closed and below said other part when the casing is open to support said other part spaced from said surface, said supporting feet each comprising a member which is a combined foot and handle, the handles being provided to manually support each end of said casing for carrying it from one position to another.

7. Means for supporting a casing or the like comprising a pair of stampings, each having a pair of feet and a flange-like handle projecting from each stamping for supporting both ends of said casing or the like either on a surface by said feet or carrying the casing by said handles.

8. Means for supporting a casing or the like comprising a pair of stampings, each having a pair of feet and handles projecting from each stamping for supporting said casing or the like either on a surface by said feet or carrying the casing by said handles, each stamping having a pair of ears for reception in perforations in said casing whereby to connect said stampings to said casing.

9. Means for supporting a casing or the like comprising a pair of stampings, each having a pair of feet and handles projecting from each stamping for supporting said casing or the like either on a surface by said feet or carrying the casing by said handles, each stamping having a pair of ears for reception in perforations in said casing whereby to connect said stampings to said casing, one of said ears hooking in its perforation and the other being bent after entering its perforation to prevent disconnection of said stampings relative to said casing.

10. Means for supporting a two part hinged electric appliance casing or the like comprising supporting feet on one of said parts for engaging a supporting surface and a handle on the other part for opening one part relative to the other and for engaging said surface when said appliance or the like is in its open position, each stamping having a pair of ears for reception in perforations in said casing whereby to connect said stampings to said casing.

11. Means for supporting a casing or the like comprising a pair of stampings, each having a pair of feet and a handle projecting from each stamping for supporting both ends of said casing or the like either on a surface by said feet or carrying the casing by said handles, each stamping being formed of sheet metal and being U-shaped in plan view, means for securing one edge thereof to said casing, feet formed on the other edge thereof and said handle projecting from the connecting part of each stamping.

12. Means for supporting a casing or the like comprising a pair of stampings, supporting feet thereon for engaging a supporting surface and handles projecting from said stampings for supporting said casing or the like either on a surface by said feet or carrying the casing by said handles, each stamping having a pair of ears for reception in perforations in said casing whereby to connect said stampings to said casing, one of said ears hooking in its perforation and the other being bent after entering its perforation to prevent disconnection of said stampings relative to said casing.

13. In an electric appliance supporting means, a stamping having a foot portion, a handle portion and an upstanding web portion and means on the upper edge of said web portion for connecting said stamping to an electric appliance casing.

14. Means for supporting a two part hinged electric appliance casing or the like comprising supporting feet on one of said parts for engaging a supporting surface and a handle on the other part for opening one part relative to the other and for engaging said surface when said appliance or the like is in its open position, each stamping being formed of sheet metal and being U-shaped, means for securing one edge thereof to said casing, feet formed on the other edge thereof and a handle flange projecting from the connecting part of each stamping.

15. In a combined handle and foot construction for casings and the like, a stamping having vertical flanges formed substantially U-shaped, means on the upper edge thereof for connecting said flanges to a casing, feet formed on the lower edge thereof and a laterally extending flange for providing a handle for the casing.

16. Supporting means for an electric appliance casing or the like, comprising a stamping having a vertical flange, means for securing said vertical flange to a casing or the like, a foot on said flange for engaging a supporting surface, and a horizontal flange extending from said vertical flange and serving as a handle for carrying said casing.

17. Supporting means for an electric appliance casing or the like, comprising a stamping having a vertical flange, means for securing said vertical flange to a casing or the like, a foot on said flange for engaging a supporting surface and a handle extending from said vertical flange for carrying said casing.

18. In a combined handle and foot construction for casings and the like, a stamping having vertical flanges formed substantially U-shaped, means for attaching the upper edge thereof to a casing, the lower edge thereof being adapted to contact with a supporting surface when the casing is supported thereon and a laterally extending flange on each stamping for providing a handle for the casing.

WILLIAM H. FISCHER.